(12) United States Patent
Aoyama

(10) Patent No.: US 7,110,022 B2
(45) Date of Patent: Sep. 19, 2006

(54) IMAGE OUTPUT CALIBRATING SYSTEM FOR CAMERAS

(75) Inventor: Chiaki Aoyama, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 614 days.

(21) Appl. No.: 10/617,255

(22) Filed: Jul. 11, 2003

(65) Prior Publication Data
US 2004/0070669 A1    Apr. 15, 2004

(30) Foreign Application Priority Data
Jul. 11, 2002 (JP) .............................. 2002-202437
Jul. 12, 2002 (JP) .............................. 2002-203375

(51) Int. Cl.
*H04N 17/00* (2006.01)
(52) U.S. Cl. ...................................... 348/187; 348/180
(58) Field of Classification Search ................ 348/180, 348/187, 188, 174, 175, 722; 702/85, 108, 702/116; H04N 17/00
See application file for complete search history.

(56) References Cited

U.S. PATENT DOCUMENTS
7,023,472 B1 * 4/2006 Kang et al. ................. 348/187

2002/0018139 A1 * 2/2002 Yamagata .............. 348/333.09

FOREIGN PATENT DOCUMENTS
JP     2-205187     8/1990
JP    11-355813    12/1999

\* cited by examiner

*Primary Examiner*—Sherrie Hsia
(74) *Attorney, Agent, or Firm*—Squire, Sanders & Dempsey L.L.P.

(57) ABSTRACT

In an image output calibrating system for cameras, a camera is supported so as to be directed at a plurality of different angles, and a light source is placed in front of the camera. A control unit associates the pan and tilt angles of the camera with corresponding positions of an image of the light source on the imaging device so that the relationship between each point on the object and the corresponding point on the image of the object formed on the imaging device of the camera can be identified. For initially placing the light source on the optical center line of the camera, the light source may be mounted on a carriage unit that can move the light source in three different directions.

9 Claims, 6 Drawing Sheets

IMAGE OUTPUT CALIBRATING SYSTEM FOR CAMERAS

TECHNICAL FIELD

The present invention relates to an image output calibrating system for cameras and other image capturing devices.

BACKGROUND OF THE INVENTION

In many applications of image capturing devices, it is necessary to establish an accurate relationship between the actual positions of a number of feature points of the actual object and the coordinates of the corresponding points of the captured image of the object. By doing so, it becomes possible to accurately identify the position of such points of the object by analyzing the captured image. This is highly important, for instance, in robotic applications where an object is required to be manipulated or otherwise acted upon according to the information gathered by capturing the image of the object.

The factors that prevent a predictable correspondence between the object and captured image include errors in the mechanical arrangement of the optical elements of the image capturing device, optical distortions that are intrinsic to the optical system of the image capturing device, optical distortions of the transparent shield which is placed in front of the image capturing device (diffractive aberration), and irregularities in the electronic imaging device that is used in the image capturing device, among other possibilities. It is known to capture the image of a grid pattern with the image capturing device, and compare the captured image with the original grid pattern so that the distortion caused by the image capturing device may be evaluated and this data may be used for calibrating the image capturing device. See Japanese patent laid-open publication No. 11-355813A.

The calibration can be in the form of a lookup table. However, a high level of resolution is normally required, and the lookup table requires a correspondingly large storage space. Alternatively, the-calibration can be effected by using high order mathematical functions for approximation. However, the handling of high order mathematical functions requires a large amount of computation for implementation. Therefore, this prior art is unsuitable for simple systems having a limited storage capacity and a limited computational capacity, and, more importantly, unsuitable for real-time applications that require prompt responses.

In a video camera for electronically recording or reproducing a color image of an object, typically, a color separation device is placed behind the lens for separating the image into the three basic colors of R (red), G (green) and B (blue), and the image signal for each of these basic colors is converted into an image signal before it is combined with the images signals of the other colors. The image signal for each color may be individually processed for a desired effect, and the combined image signals allow the color image to be stored and reproduced as required.

There are a number of ways to color separate an image. For instance, a dichroic prism having a number of reflective surfaces each consisting of a multi-layer optical interference film may be used for this purpose. Each reflective surface selectively reflects light of a prescribed color so that color separated images may be formed on separate electronic imaging devices such as CCD panels.

When a transparent shield is placed in front of such a camera, the shield may diffract different colors of the incident light differently, and various points of an object may be associated with the corresponding points on the imaging device differently depending on the color of each particular point. This can be considered as one form of chromatic aberration. In other words, when identifying the actual spatial position of each point on the object from the position of the corresponding point on the imaging device, some error may occur depending on the way the light passing through the shield is diffracted.

Japanese patent laid open publication No. 2-205187A discloses the use of separate chromatic aberration compensation circuits for different ones of the basic RGB color signals for the purpose of canceling the influences of chromatic aberration. For such compensation circuits to be effective in compensating chromatic aberration, it is necessary to compare each particular point on the object and the position of the corresponding point on the imaging device for calibration. Conventionally, such a calibration was executed by using an incandescent lamp that emits white light containing a wide range of wavelengths.

However, RGB colors that are color separated from the white light generally do not have a same energy level, and the amplification gains for the signals from the imaging devices such as CCD panels are required to be adjusted individually for each different basic color of the white light. Therefore, the calibration process tends to be both complex and time consuming.

BRIEF SUMMARY OF THE INVENTION

In view of such problems of the prior art, a primary object of the present invention is to provide an image output calibrating system for cameras that allows the positional relationship between the various points of an object to be accurately associated with the corresponding points on the image captured by the camera.

A second object of the present invention is to provide an image output calibrating system for cameras that allows images to be captured accurately even when the image as captured may be distorted due to external factors such as diffractive and/or chromatic aberration that may be caused by a transparent windshield or the like that may be placed in front of the camera.

According to the present invention, at least some of such objects can be accomplished by providing an image output calibrating system for cameras, comprising; a camera including an imaging device placed on a focal plane of the camera; a camera support for supporting the camera so as to direct the camera at a plurality of different angles; an angle sensor for detecting an angular position of the camera; a light source placed in front of the camera; and a control unit for associating angular values produced from the angle sensor with corresponding positions of an image of the light source on the imaging device. The camera as used herein may consist of any image capturing device which can capture an image of an object in an electronic form.

By directing the camera at a plurality of different angles while the light source is kept fixed, it is possible to associate the angles with the spatial position of the light source with respect to a coordinate system fixed to the camera. The camera support may comprise a fixed base, a pan table supported by the fixed base so as to be rotatable in a horizontal plane and a tilt table supported by the pan table so as to be tiltable with respect to the pan table so that the angular orientation of the camera may be identified by a pan angle and a tilt angel. The pan angle and tilt angle may be converted into directional angles that can be readily converted into orthogonal coordinate values or other coordinate systems of choice.

For placing the light source initially on the optical center line of the camera, the light source may be mounted on a carriage unit that can move the light source in two different directions perpendicular to an optical center line of the camera. Preferably, the carriage unit is adapted to move the light source in a direction parallel to the optical center line of the camera. The light source may consist of a point-source light source, a collimated light source, or a plurality of light emitting elements that can emit light of different wavelengths or colors one after another.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
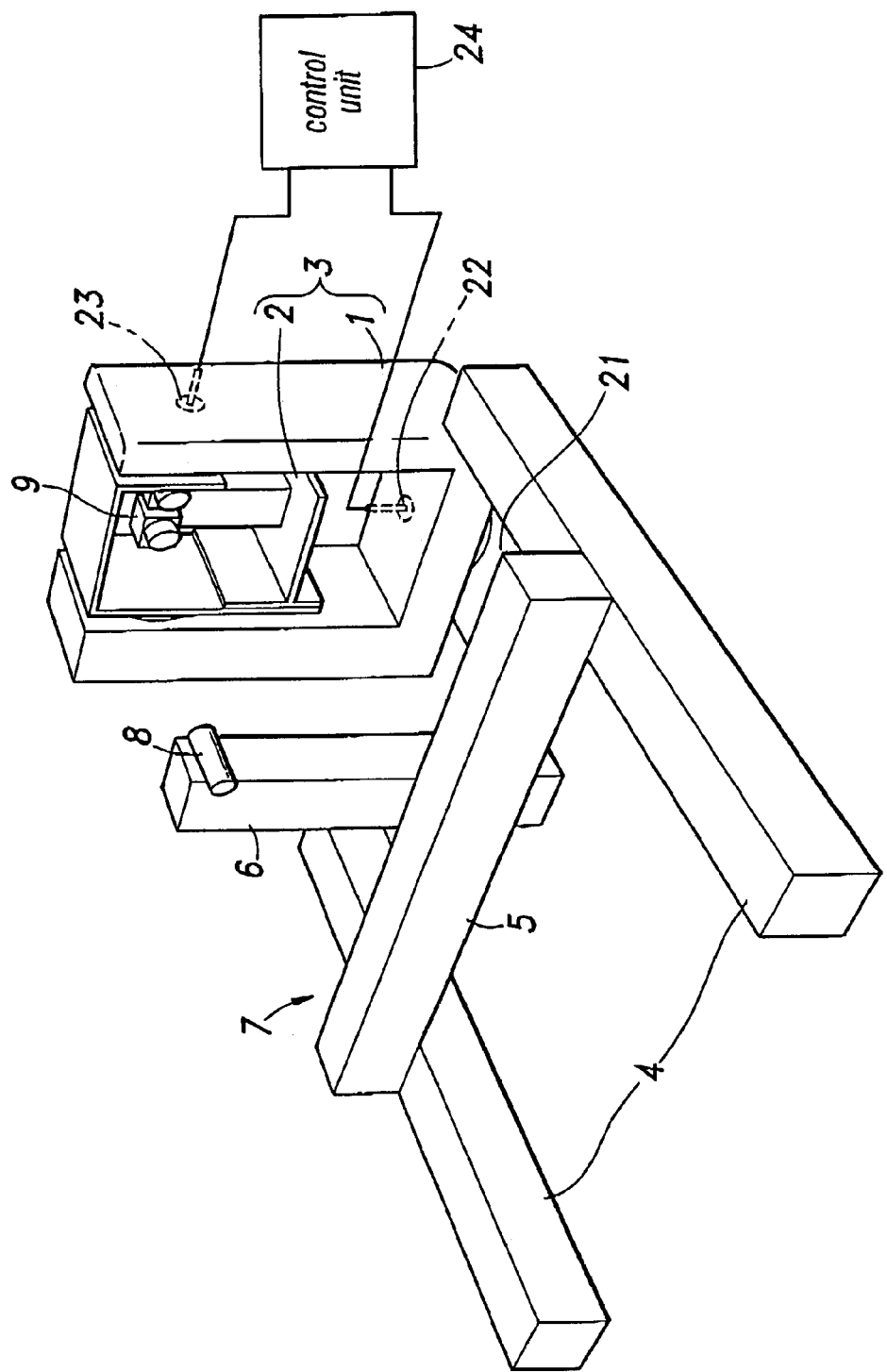
FIG. 1 is a simplified perspective view of an image output calibrating system embodying the present invention.

FIG. 1 is an overall view of an image output calibrating system for cameras embodying the present invention. This calibrating system comprises a camera support 3 supporting a camera 9, and a three-dimensional carriage unit 6 supporting a point-source light 8. The camera support 3 includes a pan table 1 that can rotate on a horizontal plane around a vertical axis relative to a fixed base 21 and a tilt table 2 that carries the camera 9 and is supported by the pan table 1 so as to be rotatable around a horizontal axis relative to the pan table 1. The three-dimensional carriage unit 6 includes a pair of X-axis rails 4 extending horizontally in the fore-and-aft direction with respect to the camera support 3 or the fixed base thereof, a Y-axis rail 5 extending laterally in a horizontal plane and slidably supported by the X-axis rails 4, and a Z-axis rail 6 extending vertically and slidably supported by the Y-axis rail 5. The point-source light source 8 is slidably supported by the Z-axis rail 6.

The pan table 1 and tilt table 2 are angularly actuated by drive units such as pulse motors that are not shown in the drawing so that the optical center line of the camera 9 carried by the tilt table 2 can be swung both vertically and laterally. The pivot shafts of the pan table 1 and tilt table 2 are provided with sensors 22 and 23 such as rotary encoders so that the pan angle and tilt angle of the optical center line of the camera can be identified. The output signals from these sensors 22 and 23 are fed into a control unit 24 that includes a CPU to process the output signals and other data for the required computation which is described hereinafter.

The Y-axis rail 5, Z-axis rail 6 and point-source light source 8 are linearly actuated by drive units each including a pulse motor and ball and screw mechanism or the like not shown in the drawing. The X-axis rails 4, Y-axis rail 5 and Z-axis rail 6 are each provided with a sensor such as a linear encoder for determining the three dimensional position of the point-source light source 8 in the three-dimensional carriage unit 6. Alternatively, the three dimensional position of the point-source light source 8 may be visually determined by using scales attached to the X-axis rails 4, Y-axis rail 5 and Z-axis rail 6. It is also possible to detect the angular positions of the pulse motors, and convert them into the three dimensional orthogonal coordinate values that identify the position of the point-source light source 8 in the three-dimensional carriage unit 6.

The point-source light source 8 may consist of any light source such as an LED and incandescent lamp as long as it presents an adequately small visual angle to the camera 9. It may also consist of a multi-color light source that can emit light of different colors one after another for the purpose of calibrating the camera for chromatic aberration as will be described hereinafter.

The principle and procedure of the calibration method according to the present invention are described in the following with reference to FIGS. 2 to 6.

Suppose that the camera 9 functions as a pinhole camera having a camera center through which the light traveling from every point on the object onto the corresponding point on the focal plane passes. In practice, the camera 9 may consist of a multi-lens camera, but is provided with a hypothetical camera center that corresponds to the aperture or pinhole of a pinhole camera. In this case, the camera 9 consists of stereoscopic cameras. Therefore, there are two cameras on either side of the center of the camera support, Because these two cameras are calibrated in a substantially identical fashion, the calibration process mostly for only one of them is described in the following.

Figure 2:
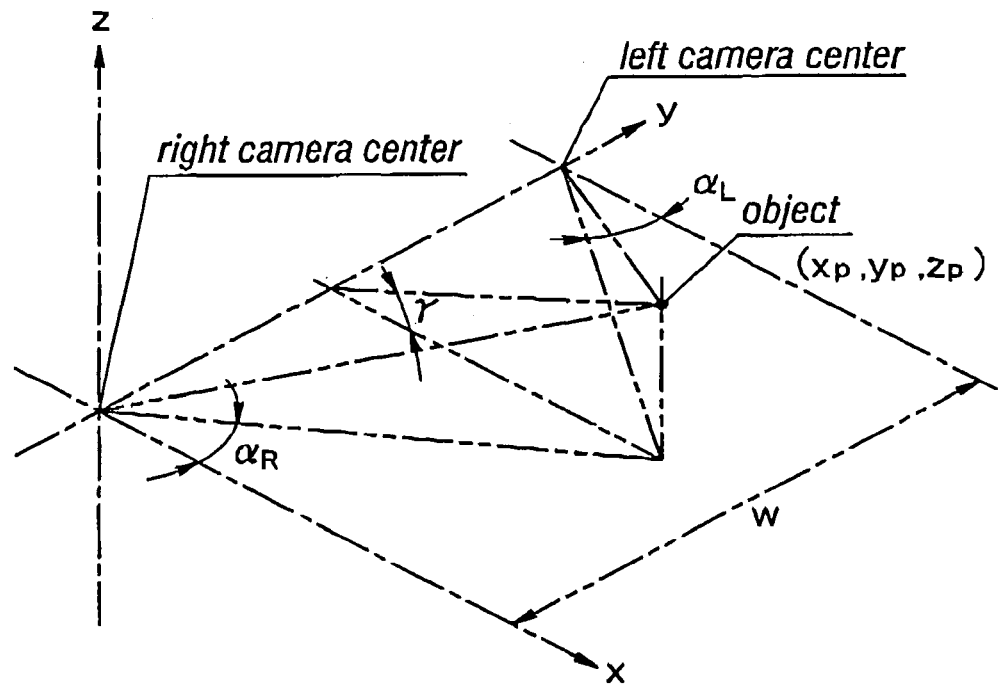
FIG. 2 is a diagram showing the position of an object represented both by directional angles and by. an orthogonal coordinate system.

When the center of the camera on the right is placed at the origin of the coordinate system, as shown in FIG. 2, the position of an object $(x_p, y_p, z_p)$ can be related to the directional information (angles) of the camera as given in the following.

$$x_p = w/(\tan \alpha_R - \tan \alpha_L)$$

$$y_p = x_p \tan \alpha_R$$

$$z_p = x_p \tan \gamma$$

where w is the distance between the two stereoscopic cameras, and $\alpha$ is the angle of the object as projected onto the X-Y plane while $\gamma$ is the angle of the object as projected onto the X-Z plane.

Figure 3:
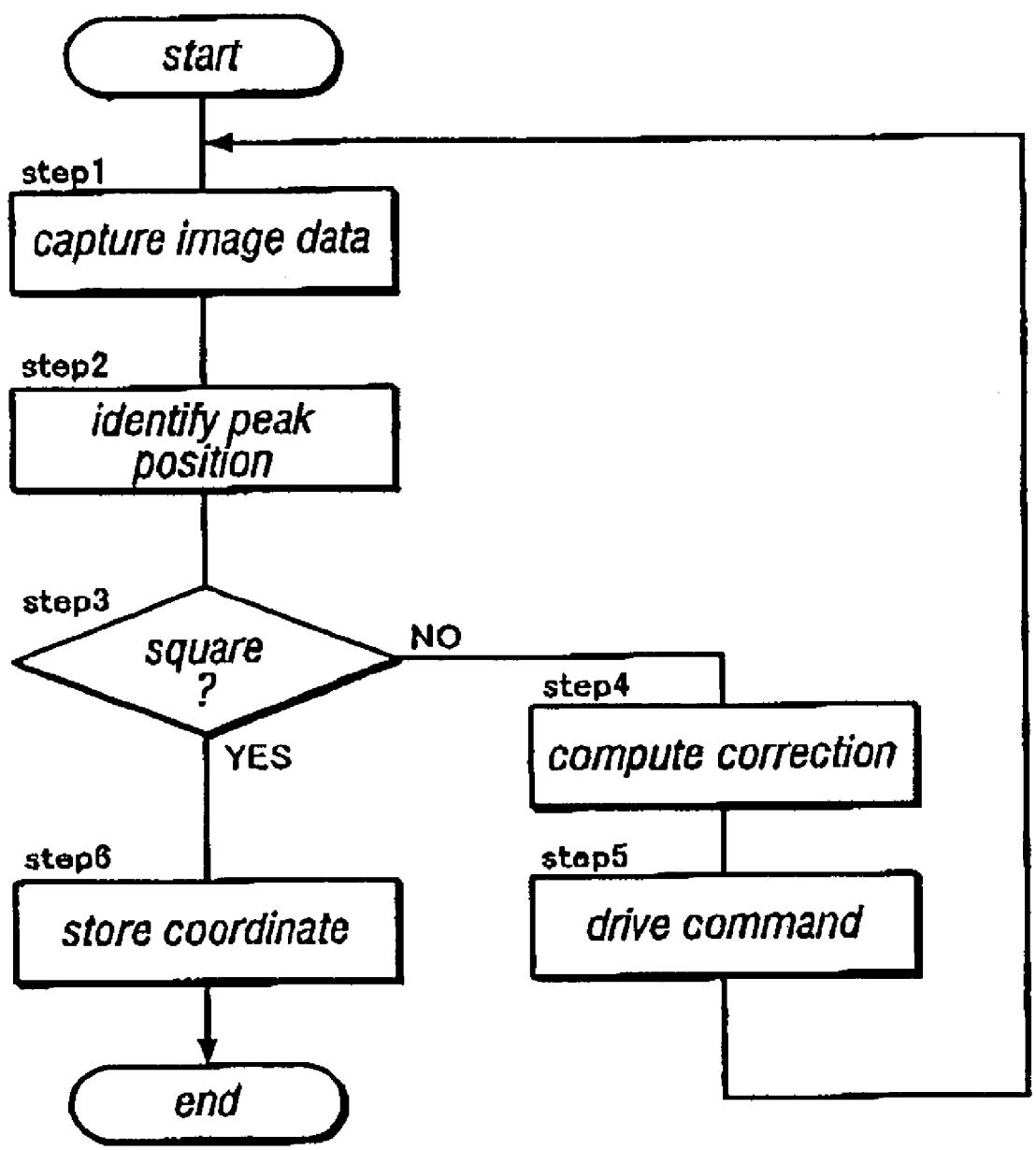
FIG. 3 is a flow chart showing the process of placing the light source on the optical center line of the camera.

Before calibrating the correspondence between the object and image thereof, the position of the camera center is identified as described in the following with reference to FIG. 3. First of all, the tilt table 2 is oriented horizontally by using a level or the like, and the camera 9 is directed to the light source 8 placed in front of the camera 9. The image of the light source is thereby formed on the imaging device on the focal plane of the camera 9. The imaging device comprises a matrix of light sensitive pixels which are arranged in a planar orthogonal coordinate system. The output of the imaging device is A/D converted, and stored in video memory (step ST1). The image is obtained as a white spot having a certain expanse, and a central pixel is extracted from this image by detecting the peak of the output in the orthogonal coordinate system (step ST2).

The light source 8 is moved along the X-axis rails 4 by a suitable distance, and. it is determined if the positional change of the central pixel is within a prescribed range (step ST3). If the positional change of the central pixel is beyond the prescribed range, the offset of the camera center from the origin of the YZ coordinate system is estimated from the magnitude of the positional change of the central pixel (step ST4), and the light source 8 is moved along the Y-axis rail and Z-axis rail by corresponding distances (step ST5).

Figure 4:
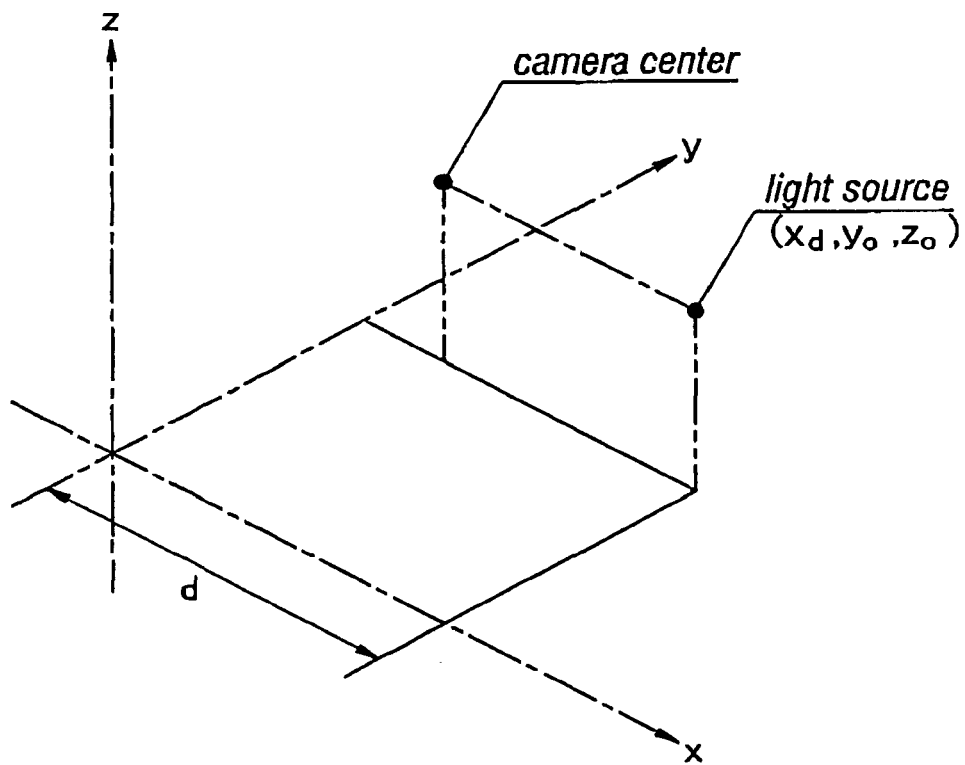
FIG. 4 is a diagram showing the positions of the camera and light source when the light source is placed on the optical center line of the camera.

This process is repeated until the movement of the central pixel when the light source is moved along the X-axis rails 4 is reduced and kept within a prescribed range. When it is achieved, it means that the optical center of the camera 9 aligns with the light source 8 (FIG. 4). The Y- and Z-coordinates of the light source 8 at this time are stored in memory (step ST6).

Figure 5:
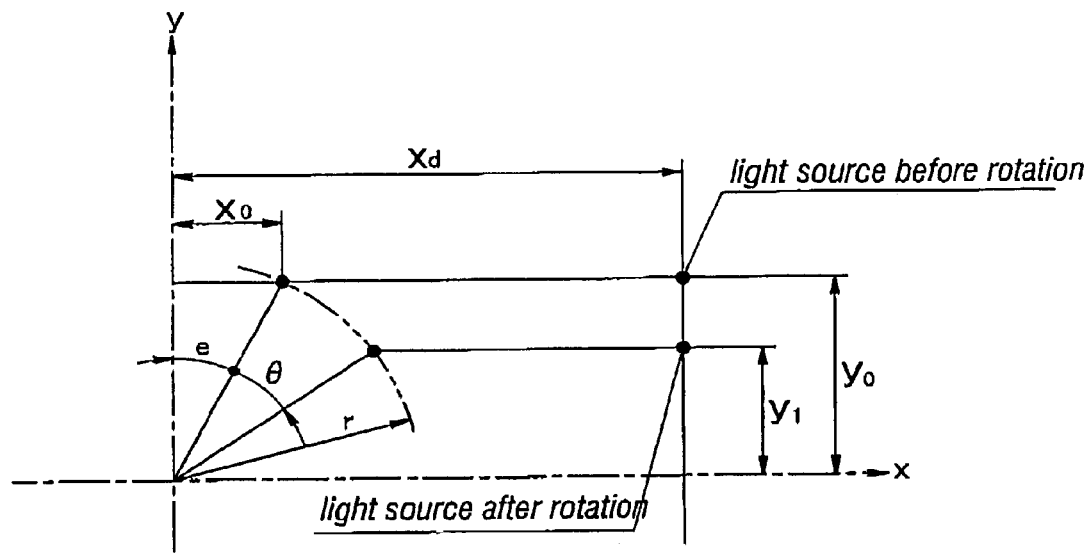
FIG. 5 is a diagram showing how the offset of the camera center along the X-axis can be determined.

By executing the foregoing process, the position of the camera center is determined as $(x_d, y_0, z_0)$ as illustrated in FIG. 4. Therefore, only the X-coordinate of the camera is yet to be determined. The offset of the camera center in the X-direction can be determined by slightly panning the camera. In this coordinate system, suppose that the angle of the camera center with respect to the Y-axis is e, the panning angle is θ, and the distance between the origin and camera center is r. Because the Y-coordinates of the light source before and after the panning ($y_0$ and $y_1$) and the panning angle θ are known, r and e, hence $x_0$, can be known from the following equations that hold as can be seen in FIG. 5.

$$e=\tan^{-1}\{(y_0 \cos\theta - y_1)/y_0 \sin\theta\}$$

$$r=y_0/\cos e$$

$$x_0=y_0 \tan e$$

Once the offset of the camera center is known for each of the coordinate axes, the inner parameter of the camera can now be identified so that various points of the object are accurately associated with the corresponding points on the imaging device. This is necessary, because, due to inevitable dimensional and positional errors of the various components and other causes, various points of the object do not quite correspond in position to the counterparts in the image on the imaging device.

Figure 6:
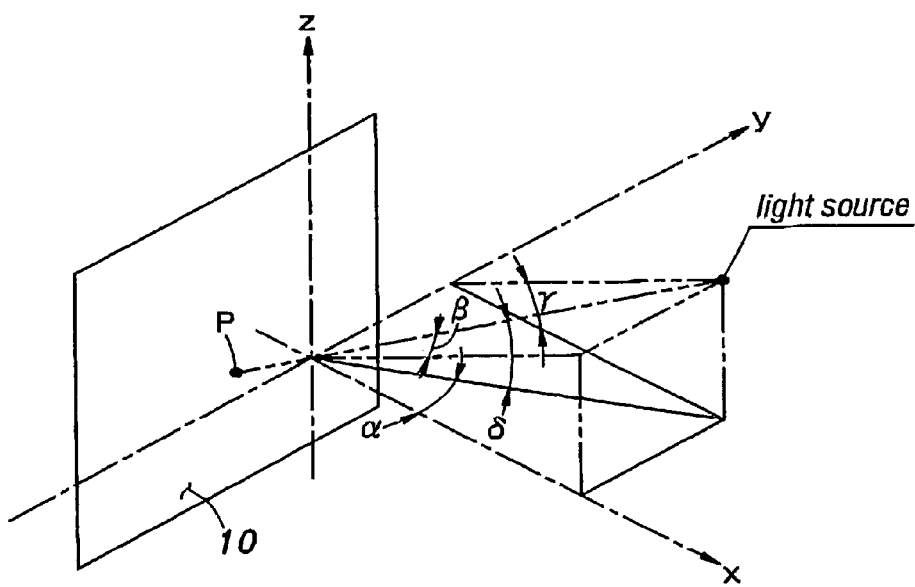
FIG. 6 is a diagram showing the relationship between the pan and tilt angles and the directional angles.

Referring to FIG. 6, a point P is selected on the imaging device 10 of the camera, and the camera is panned and tilted until the central pixel of the image of the light source 8 coincides with the selected point. The pan angle and tilt angle are denoted by β and δ, respectively, in FIG. 6. The pan angle β and tilt angle δ are related to the directional angles α and γ that can be readily associated with the Y- and Z-coordinates of the object as given in the following.

$$\alpha=\tan^{-1}(\tan\delta/\cos\gamma)$$

$$\beta=\tan^{-1}(\tan\gamma\cdot\cos\alpha)$$

$$\delta=\sin^{-1}(\cos\beta\cdot\sin\alpha)$$

$$\gamma=\tan^{-1}(\tan\beta/\cos\alpha)$$

By repeating this process on a number of points on the imaging device 10, it is possible to associate a number of points on the object with the corresponding points on the imaging device, and calibrate the offset in the correspondence between each point on the object and the corresponding point on the imaging device.

Figure 7:
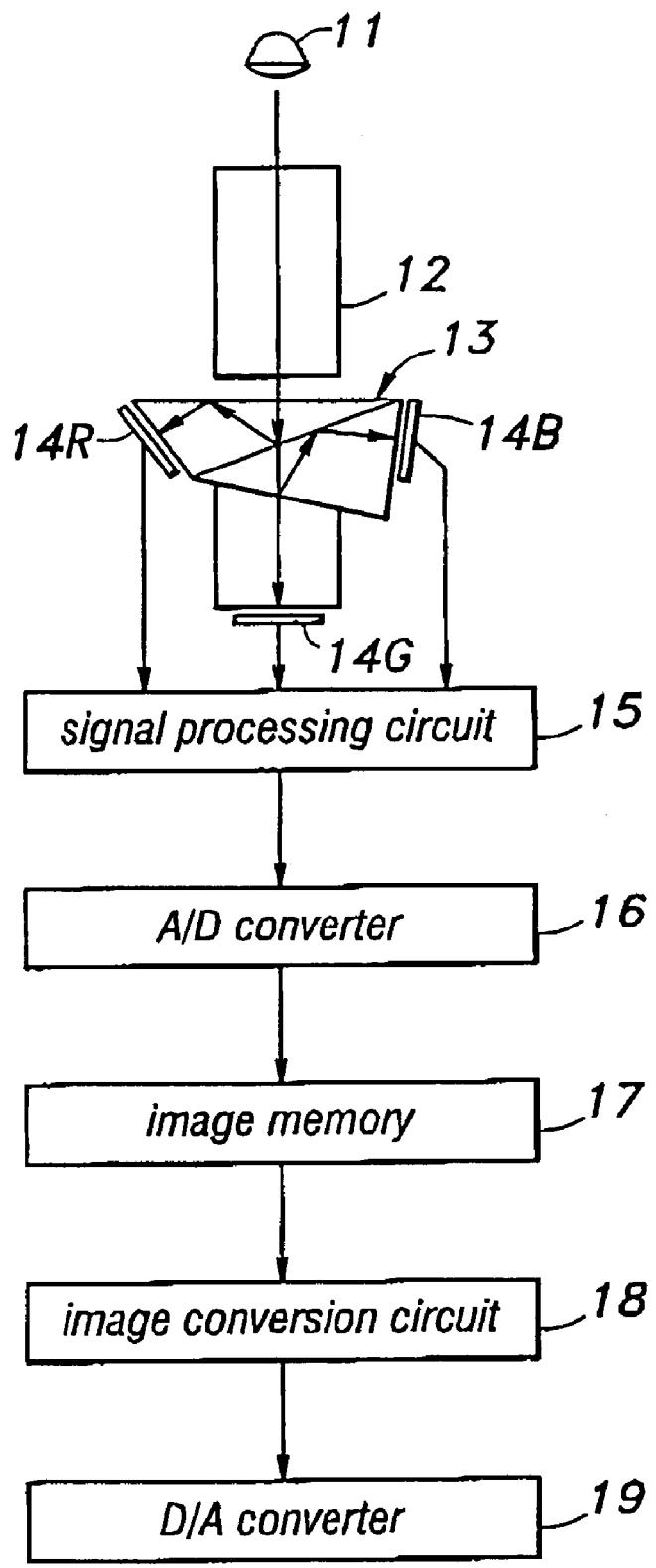
FIG. 7 is a functional block diagram showing the calibrating system for compensating for chromatic aberration.

FIG. 7 shows the functional structure of a color image capturing device to which the present invention is applied. The light having a prescribed color (wavelength) from a lamp set 11 is received by a color separation optical system 13 via an imaging lens 12. The color separation optical system 13 may comprise a diachronic prism, and the color separated images are formed on three CCD panels 14R, 14B, 14G that are attached to the corresponding light emitting surfaces of the prism. Each CCD panel is provided with a photo-optical converting function and a scanning function, and produces an electric signal corresponding to the color separated image formed thereon. The electric signals from these CCD panels are processed by a signal processing circuit 15 incorporated with pre-amplifiers, and converted into a set of color image signals, for instance, consisting of a brightness signal Y and color difference signals Pr and Pb.

These signals are digitized by an A/D converter 16, and are temporarily stored in video memory 17. A signal corresponding to a prescribed position of the image is extracted from the video memory 17 for each color, and is processed by a compensation circuit for the corresponding color that is incorporated in an image conversion circuit 18 so that the position of the corresponding pixel in the imaging device may be correctly associated with the position of the corresponding point on the object. All of the signals are processed in this fashion, and then combined so as to be converted by a D/A converter 19 into a video signal suitable for a video recorder or a video monitor.

Figure 8:
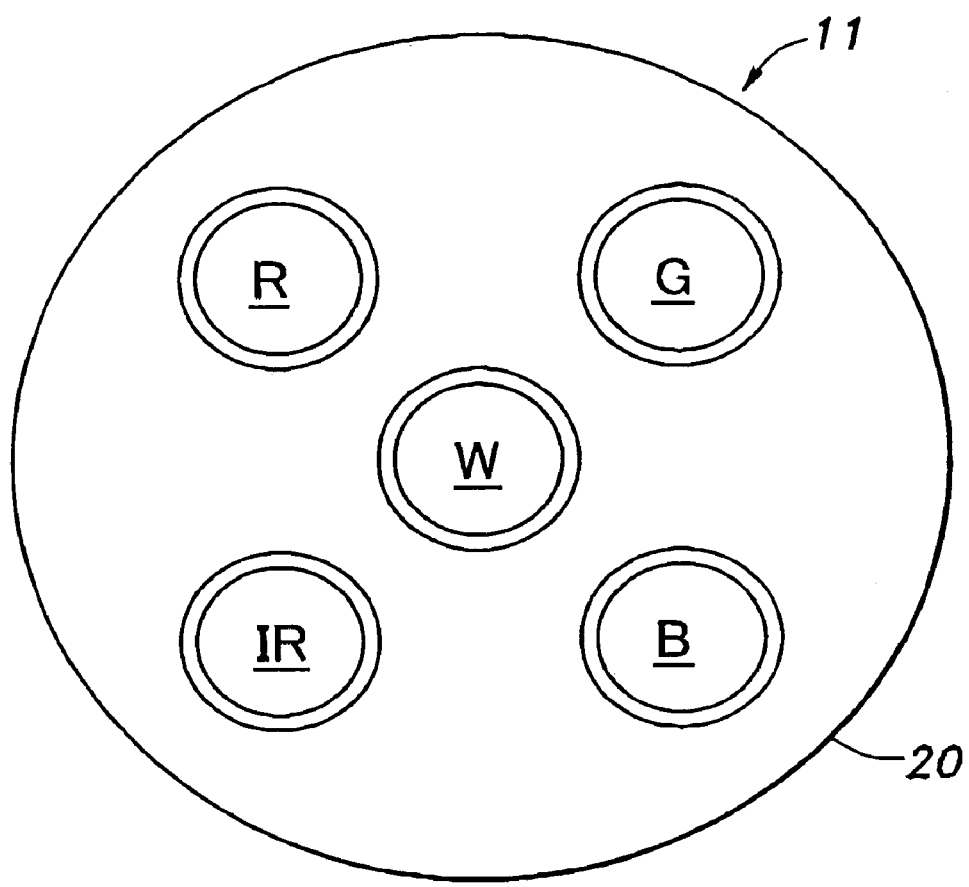
FIG. 8 is a front view of the light source suitable for use in the calibration system of FIG. 7.

FIG. 8 shows the lamp set 11 used for the calibration according to the present invention. This lamp set 11 comprises three lamps R, G, B each for emitting light of a prescribed wavelength. For instance, the wavelengths are selected so that each of the three basic colors R, G and B may be produced. The lamp set 11 additionally includes a white light lamp W and a near infrared light lamp IR. These lamps R, G, B, W and IR are mounted on a common base 20, and are each incorporated with a collimator lens so that each of them may serve as a light source placed at an infinitely remote point and all of the lamps appear to be located on a same point as seen from the camera. The lamp set 11 may be used as the light source 8 shown in FIG. 1, and only one of the lamps may be lighted at a time so that the CCD panel of the corresponding light may be calibrated individually. The near infrared light lamp IR is used for calibrating high sensitivity infrared cameras.

This arrangement allows distortions of images to be calibrated for each selected color so that the object and captured image can be associated with each other in a point-wise manner for each color, and positional deviations arising from chromatic aberration arising either outside or inside the camera can be accurately evaluated. Therefore, once the camera is calibrated in this manner, the image closely corresponds to the actual object, and a highly precise image capturing is enabled. Also, this embodiment allows the chromatic aberration that may exist to be accurately corrected so that an image can be captured in a highly chromatically accurate manner.

Although the present invention has been described in terms of preferred embodiments thereof, it is obvious to a person skilled in the art that various alterations and modifications are possible without departing from the scope of the present invention which is set forth in the appended claims.

The invention claimed is:

1. An image output calibrating system for cameras, comprising;

a camera including an imaging device placed on a focal plane of said camera;

a camera support for supporting said camera so as to direct said camera at a plurality of different angles;

an angle sensor for detecting an angular position of said camera;

a light source placed in front of said camera; and a control unit for associating angular values produced from said angle sensor with corresponding positions of an image of said light source on said imaging device.

2. An image output calibrating system according to claim 1, wherein said camera support comprises a fixed base, a pan table supported by said fixed base so as to be rotatable in a horizontal plane and a tilt table supported by said pan table so as to be tiltable with respect to said pan table.

3. An image output calibrating system according to claim 2, wherein said control unit is adapted to associate a plurality of pan angles and tilt angles produced from said angle sensor with corresponding Cartesian coordinate values of said imaging device.

4. An image output calibrating system according to claim 1, further comprising a carriage unit adapted to move said light source in two different directions perpendicular to an optical center line of said camera.

5. An image output calibrating system according to claim 4, wherein said carriage unit is adapted to move said light source in a direction parallel to said optical center line of said camera.

6. An image output calibrating system according to claim 1, wherein said light source comprises a point-source light source.

7. An image output calibrating system according to claim 1, wherein said light source comprises a collimator lens.

8. An image output calibrating system according to claim 1, wherein said light source comprises a plurality of light emitting elements that can emit light of different wavelengths or colors one after another.

9. An image output calibrating system according to claim 8, wherein said light emitting elements are placed laterally one next to another, and are each incorporated with a collimator lens.

* * * * *